J. MUZIK.
AUTO TIRE.
APPLICATION FILED OCT. 11, 1916.
1,252,830.
Patented Jan. 8, 1918.
2 SHEETS—SHEET 2.
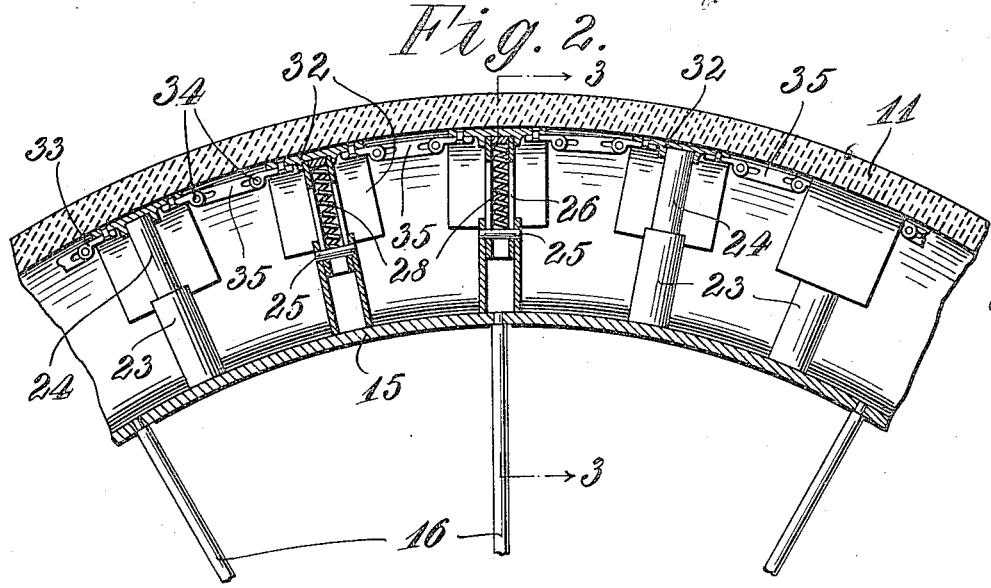
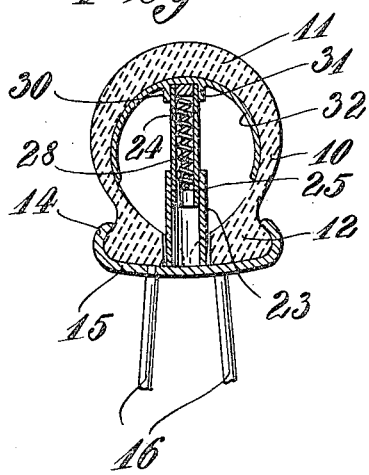
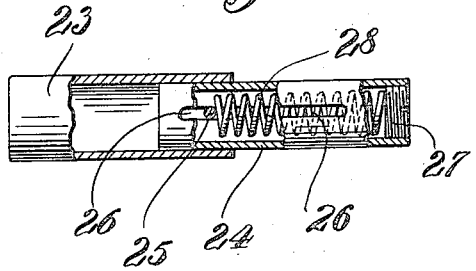
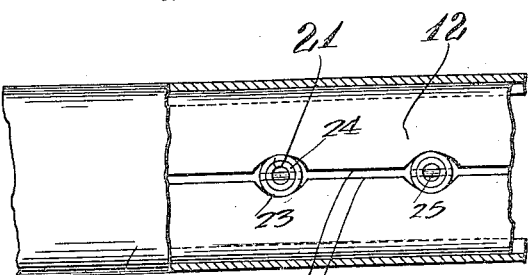
Inventor
John Muzik
By his Attorney
Oscar Gill

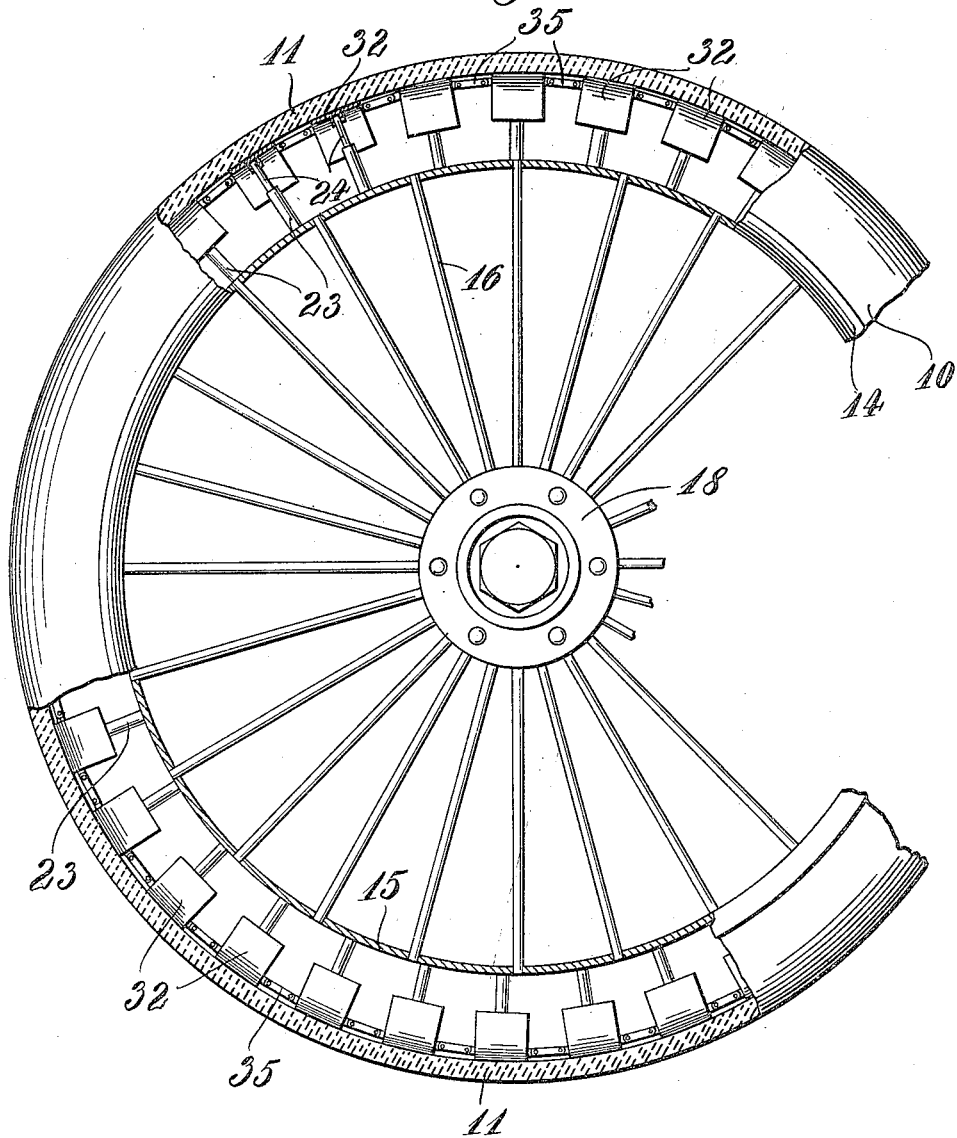

UNITED STATES PATENT OFFICE.

JOHN MUZIK, OF EUREKA, CALIFORNIA, ASSIGNOR OF ONE-THIRD TO JOHN SUCHANEK AND ONE-THIRD TO ANTON ANDRACEK, BOTH OF EUREKA, CALIFORNIA.

AUTO-TIRE.

1,252,830.

Specification of Letters Patent.

Patented Jan. 8, 1918.

Application filed October 11, 1916. Serial No. 124,957.

*To all whom it may concern:*

Be it known that I, JOHN MUZIK, a subject of the Emperor of Austria, and a resident of Eureka, in the county of Humboldt and State of California, have invented new and useful Improvements in Auto-Tires, of which the following is a specification.

This invention relates to improvements in automobile tires and has as its principal object the provision of means whereby an elastic, resilient tire is produced similar in effects to that attained by the pneumatic tires now in common use, but which is not subject to punctures or like accidents rendering the tire at least temporarily unfit for use.

A further object is to provide such devices relatively cheap in their construction, neat in appearance and as easy of application as is the ordinary tire.

These and other allied objects are attained by the novel design, construction and combination of parts hereafter described and shown in the accompanying drawing, forming a material part of this disclosure, and in which:—

Figure 1 is a partial side elevation and sectional view of a tire made in accordance with the invention.

Fig. 2 is an enlarged longitudinal sectional view of the same.

Fig. 3 is a transverse sectional view taken on line 3—3 of Fig. 2.

Fig. 4 is a partial side and sectional view showing one of the spring cushioning elements and, Fig. 5, is a fragmental plan view of the wheel rim, parts being broken away showing the engaged tire and connected parts.

In the construction indicated in the drawings 10 represents the tire casing having a thickened contact or tread surface 11 and enlarged beadings 12 by which the tire is held normally within the in-turned lateral elements 14 of the rim 15 to which are engaged the spokes 16 radiating from the common hub 18.

The beadings 12 of the tire, which are preferably formed of rubber or other elastic and resilient material, have their edges 20 brought closely adjacent but spaced so as not to completely come in contact, while at regular intervals between them are openings 21 adapted to receive the tubular sleeves 23 or the outer telescopic members of the spring containing elements 24, through which pass pins 25 set rigidly in the outer end of the elements 23 and passing through slots 26 formed in the lower end of the elements 24; a screw cap 27 or like fastening holding the springs 28 constrained between the pins 25 and caps 27 so as to normally hold the elements 24 extended.

The outer ends of the elements 24 are suited to be received in the recesses 30 formed in hub-like projections 31 fixedly attached to curved resilient plates 32 adapted to engage within the tire 10 holding its sides expanded and at the same time transmitting the pressure of the springs 28 so as to exert pressure between the tread 11 and the rim 15 against which the lower ends of the telescopic elements 23 abut.

Engaged at the opposite ends of the elements 32 are rigid brackets 33 extending toward each other closely adjacent to the inner wall of the tread and having connected by pivots 34, links 35, so that the resilient elements 32 may not become displaced, thus holding the outer ends of the elements 24 in relative position while the inner elements 23 are held by the inner, opposite sides of the tire. It will be understood that the links 35 have the holes for the pivots 34 slightly elongated so as to allow a necessary freedom of action.

From the foregoing it will be seen that the tire is maintained in an expanded position by the thrust of the springs against relatively rigid metallic elements equally spaced around the circumference thereby allowing the tread portion to move relative to the rim in a manner closely similar to that obtained by a pneumatic tire and it will be evident that should a puncture occur that it will not affect the tire.

Having thus described my invention, what I claim as new and desire to secure by Letters Patent, is:—

1. In a tire of the class described, the combination with a hollow resilient tire casing, and a rigid rim engaged therewith, of a plurality of arcuate plates disposed within said tire casing, said plates conforming to its interior, tubes suited to be received in recesses formed in the inner adjacent edges of said tire casing, telescopic elements operable in said tubes, springs contained in said telescopic elements, means combined therewith whereby said springs are caused to press outwardly, said telescopic elements being engaged with said arcuate plates and means for connecting said arcuate plates in such manner as to hold the same spacedly engaged within the tire casing.

2. In a tire of the class described, the combination with a rigid rim, and a flexible hollow tire casing engaged therewith, of a plurality of arcuate, sector-like, resilient plates disposed at spaced intervals within said tire casing, links pivotally connecting said arcuate plates, tubes disposed within recesses formed in the inner adjacent edges of said tire casing abutting against said rigid rim, telescopic elements slidably engaged therein, springs contained in said telescopic elements adapted to exert pressure against said arcuate plates.

In testimony whereof I have signed my name to this specification.

JOHN MUZIK.

Copies of this patent may be obtained for five cents each, by addressing the "Commissioner of Patents, Washington, D. C."